Feb. 22, 1944. W. DAVIES 2,342,458
PACKING SPACER
Filed Jan. 21, 1941 2 Sheets-Sheet 1
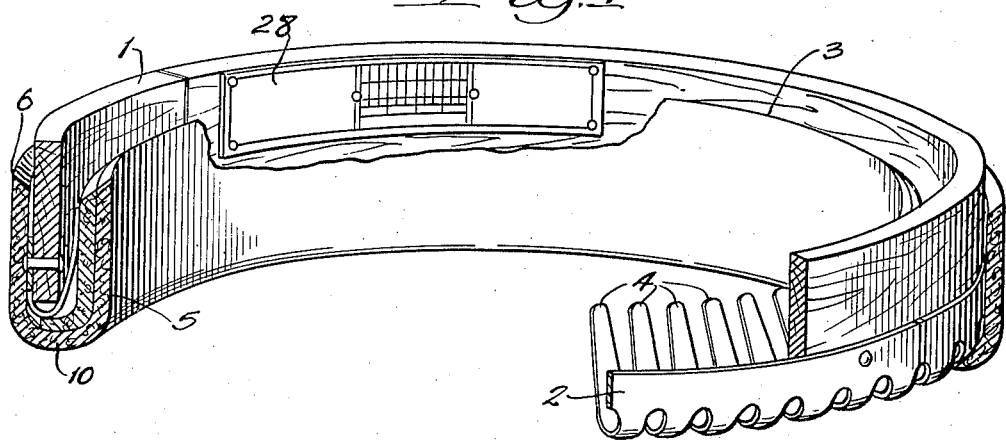
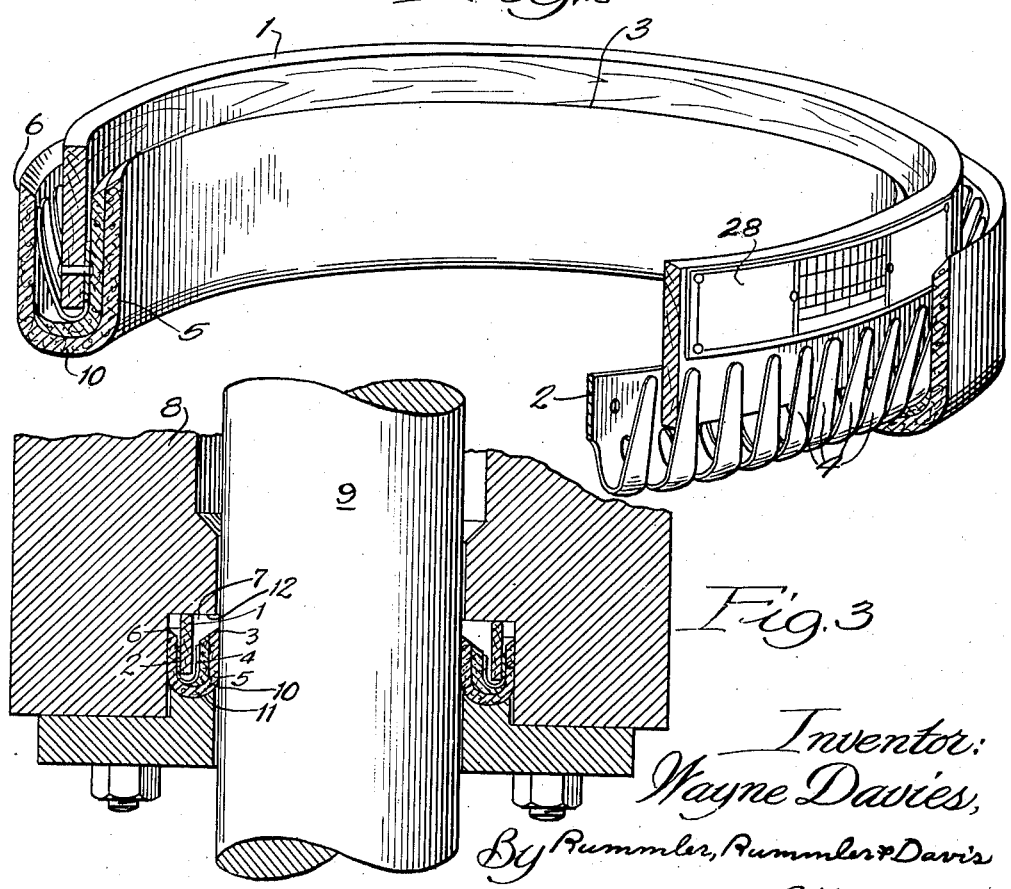
Inventor:
Wayne Davies,
By Rummler, Rummler & Davis
Attorneys.

Feb. 22, 1944.    W. DAVIES    2,342,458
PACKING SPACER
Filed Jan. 21, 1941    2 Sheets-Sheet 2
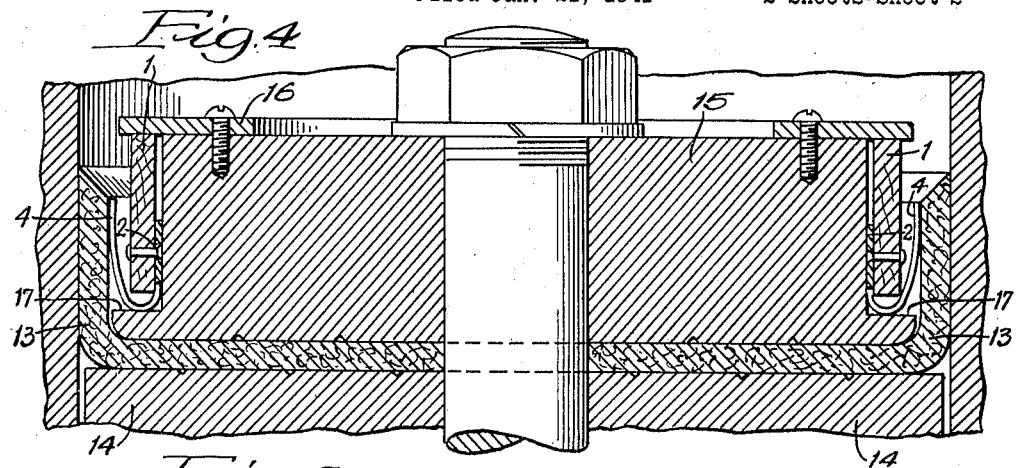
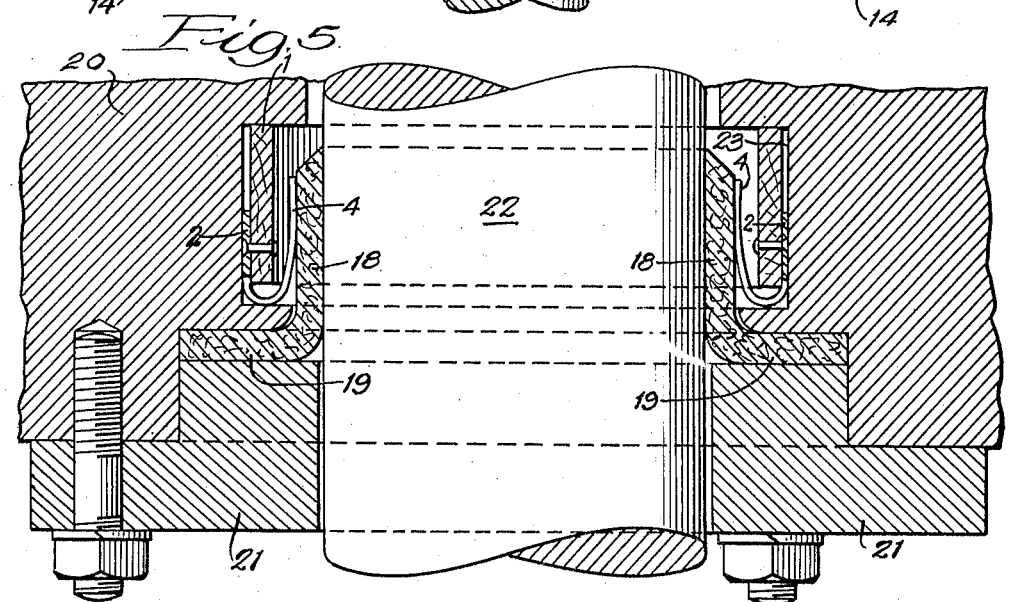
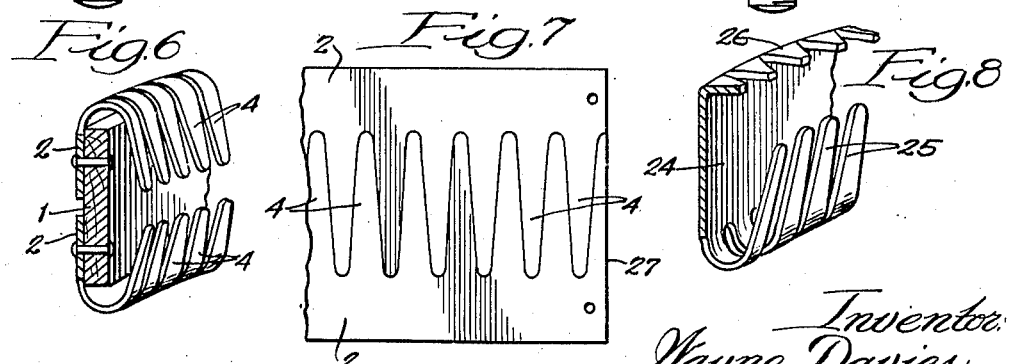
Inventor
Wayne Davies,
By Rummler, Rummler & Davis
Attorneys.

Patented Feb. 22, 1944

2,342,458

UNITED STATES PATENT OFFICE 2,342,458

PACKING SPACER

Wayne Davies, Chicago, Ill.

Application January 21, 1941, Serial No. 375,285

4 Claims. (Cl. 288—5)

Resilient spacers, as disclosed herein, are used in assisting to maintain packing rings in symmetrical form and contact between a plunger and cylinder. The packings are carried by either the plunger or the cylinder and are held in snug sliding contact with the other of these two elements by means of the improved spacers or spreading members. The packings, of varying shapes cross-sectionally, are in many cases subject to extreme hydraulic pressures, and while the spacers are not intended to act against these pressures, the spacers do function to maintain a light primary seal and to maintain the initial shape of the packings.

The objects of this disclosure are to provide a spacer construction easily formed to any desired diameter and meeting the requirements of varying types of packings and to efficiently distribute the support of the spacer on the packings.

Special objects of the particular spacer construction are to permit of required lengths of the spacer elements being cut from elongated straight flat strips and then conformed to the curvature of whatever diameter packing is employed.

Specific embodiments of the spring spacer showing its suitability to different kinds of packings are illustrated by the drawings wherein:

Figure 1 is a perspective view of a U-packing ring sectioned to show the position of a spacer within the ring.

Fig. 2 is a similar view with the spacer curved in opposite direction.

Fig. 3 is a fragmentary longitudinal section through a cylinder and plunger showing the arrangement of Fig. 1 in use.

Fig. 4 is a longitudinal section view of a plunger and cylinder employing a cup-packing which is supported by a spacer like that of Fig. 2.

Fig. 5 is a longitudinal view of a plunger, cylinder, and a flange packing, the latter two elements being sectioned. The spacer shown here is the same as that of Fig. 1.

Fig. 6 is a fragmental detail partly in section of a spacer for use in a double seal packing.

Fig. 7 shows part of a stamped strip of metal from which required lengths of the spring elements for spacers are cut and then formed into proper shape.

Fig. 8 is a further embodiment of the spring spacer.

The spacer comprises a flat spring metal strip having laterally directed comb teeth and curved into a cylindrical ring for conforming to the curvature of a ring packing. The individual comb teeth are bent backward in U-shape between the tips and the roots thereof, so that the ends of the teeth lie in an annular surface substantially concentric with the axis of a packing ring. The comb is supported and braced by a ring-shaped core or may be so formed as to eliminate need for the core.

Figure 1 shows a wooden hoop or core 1, a spring comb 2 riveted to the core and a U-packing 3 so disposed that the comb teeth 4 press against the sliding side 5 of the packing. A reversely curved comb is illustrated by Fig. 2, in which the teeth bear against the static side 6 of the packing. Either position of the comb is suitable for the same use. The bend in the comb teeth is spaced away from the base or body part of the comb, in order that the base may be readily bent to cylindrical shape and conformed to varying circumferences without distortion.

Fitted within an annular recess 7 of a cylinder 8, the packing hugs a plunger or shaft 9, as shown in Fig. 3. The packing heel 10 bears on a conformingly curved or flat end 11 of a packing gland and the core 1 bears against the end 12 of recess 7. Under this arrangement the packing clings to the plunger under radial pressure from the spring. Pressure provided by the spring and core in four directions aids in preventing the packing from crawling.

When employed with a cup packing as illustrated by Fig. 4, wherein a cup packing 13 is clamped between the end of a plunger 14 and a follower plate 15, the relative position of the core 1 and comb 2 is the same as that of Fig. 2. The top of the core is braced against a cap ring 16 screwed to the top of the follower plate and the curved portion of the comb teeth 4 rests on a shelf 17 of the follower plate. The teeth press the side of the packing cup against the cylinder as illustrated.

A flange packing 18, as illustrated in Fig. 5, is suited to the core and comb arrangement of Fig. 1. The flange 19 of this packing is clamped between the end of a cylinder 20 and gland ring 21 and the inner circumference of the packing rests against the plunger 22. The core and comb are braced within a recess 23, as illustrated, and the comb teeth bear against the outer circumference of the packing.

The spacer of Fig. 8 dispenses with the bracing core, but is so formed as to provide the supporting surfaces which would otherwise be furnished by the core. This spacer comprises a double comb 24 having teeth 25 on one side similar to teeth 4 of comb 2, Figs. 1 to 5, and at the other side having comb teeth 26 which are bent at the teeth roots to provide a surface serving a similar purpose to that of core 1, Figs. 1 to 5. This spacer may be stamped and cut from a flat strip and since the bending line of the comb teeth is spaced away from the comb base, the article may be easily conformed to a true circle.

For use in a packing having oppositely disposed sealing surfaces, a pair of combs 2 may be fastened one at each side of core 1, as indicated in Fig. 6.

In the manufacture of this type of packing ring spacer or spreader, the supporting hoops 1 for the spring comb elements 2 may be formed, for example, from white oak strips which are steamed to enable bending into circular hoops of the required diameters. The spring comb elements 2 are preferably punched from strips or ribbons of phosphor bronze, these punched strips being cut to the required lengths to suit packing diameters. The teeth are then bent or curved uniformly backward upon themselves so that the ends of the teeth substantially parallel the band portion of the comb. Then the comb is bent into circular form and riveted to the wooden hoop. As shown in Figures 1 and 2, the wooden hoop carries a tag 28 which may be of copper and serves for receiving installation dates of the packing for the purpose of checking service records thereof.

I claim:

1. A packing spacer, comprising a straight flat strip of resilient spring material having laterally directed comb teeth on one edge thereof, said teeth being bent to U-shape about a straight line extending longitudinally with respect to the body of the strip and spaced therefrom and the ends of said strip being brought together to form a cylindrical band of single curvature.

2. A packing spacer, comprising a straight flat strip of resilient spring material having laterally directed comb teeth on one edge thereof, said teeth being bent to U-shape about a straight line extending longitudinally with respect to the body of the strip and spaced therefrom and the ends of said strip being brought together to form a cylindrical band of single curvature with said comb teeth conforming to a surface of revolution concentric with the axis of the band.

3. A packing spacer, comprising an elongated flat strip of resilient spring material having laterally extending comb teeth on a longitudinal edge thereof, said teeth being bent out of the plane of said strip about a line spaced outside of the body of the strip and substantially parallel with its toothed edge, and said strip having its ends brought together to form a cylindrical band, and a cylindrical core member attached concentrically to said band.

4. A packing spacer, comprising an elongated flat strip of resilient spring material having laterally extending comb teeth on a longitudinal edge thereof, said teeth being bent out of the plane of said strip about a line spaced outside of the body of the strip and substantially parallel with its toothed edge, and said strip having its ends brought together to form a cylindrical band, and a cylindrical core member attached concentrically to said band and extending into the channel formed by the bends of said comb teeth.

WAYNE DAVIES.